US009875659B2

(12) United States Patent
Feyereisen et al.

(10) Patent No.: US 9,875,659 B2
(45) Date of Patent: Jan. 23, 2018

(54) SYSTEM AND METHOD FOR EXOCENTRIC DISPLAY OF INTEGRATED NAVIGATION

(71) Applicant: HONEYWELL INTERNATIONAL INC., Morristown, NJ (US)

(72) Inventors: Thea L. Feyereisen, Hudson, WI (US); Troy Nichols, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 130 days.

(21) Appl. No.: 14/546,881

(22) Filed: Nov. 18, 2014

(65) Prior Publication Data
US 2016/0140850 A1     May 19, 2016

(51) Int. Cl.
| | |
|---|---|
| *G08G 5/00* | (2006.01) |
| *G01C 23/00* | (2006.01) |
| *G05D 1/06* | (2006.01) |
| *G05D 1/04* | (2006.01) |

(52) U.S. Cl.
CPC .......... *G08G 5/006* (2013.01); *G01C 23/005* (2013.01); *G08G 5/0021* (2013.01); *G08G 5/0052* (2013.01); *G08G 5/0078* (2013.01); *G08G 5/0086* (2013.01); *G08G 5/0091* (2013.01); *G05D 1/04* (2013.01); *G05D 1/06* (2013.01)

(58) Field of Classification Search
None
See application file for complete search history.

(56) References Cited

U.S. PATENT DOCUMENTS

| | | | |
|---|---|---|---|
| 4,940,987 A | 7/1990 | Frederick | |
| 6,057,786 A | 5/2000 | Briffe et al. | |
| 7,286,062 B2 | 10/2007 | Feyereisen et al. | |
| 7,375,678 B2 | 5/2008 | Feyereisen et al. | |
| 7,917,289 B2 | 3/2011 | Feyereisen et al. | |
| 8,099,234 B1 | 1/2012 | Frank et al. | |
| 8,140,260 B2 | 3/2012 | Feyereisen et al. | |
| 8,164,485 B2 | 4/2012 | Prinzel, III et al. | |
| 8,339,283 B2 | 12/2012 | Filliatre et al. | |
| 8,350,753 B2 | 1/2013 | Pal et al. | |
| 8,384,730 B1 | 2/2013 | VanDerKamp et al. | |
| 8,456,328 B2 | 6/2013 | Karthikeyan et al. | |

(Continued)

FOREIGN PATENT DOCUMENTS

| | | |
|---|---|---|
| EP | 2151669 A2 | 2/2010 |
| EP | 2189755 A1 | 5/2010 |

(Continued)

OTHER PUBLICATIONS

Garmin; Garmin SVT: Synthetic Vision Technology; 2008 Garmin Ltd.

(Continued)

*Primary Examiner* — Rami Khatib
*Assistant Examiner* — Gerrad A Foster
(74) *Attorney, Agent, or Firm* — Lorenz & Kopf, LLP

(57) ABSTRACT

A system and method are provided for displaying a strategic navigational overview of a vehicle, including a navigational map and a marker icon thereon representing an entity pertinent to navigation of the vehicle. A vertical line contacting the marker icon has, contiguous thereto, a current altitude icon representing the current altitude of the vehicle, and a trending icon indicating a direction of a change in altitude of the vehicle.

20 Claims, 3 Drawing Sheets

(56) References Cited

U.S. PATENT DOCUMENTS

| | | |
|---|---|---|
| 2003/0156046 A1 | 8/2003 | Dwyer et al. |
| 2003/0210228 A1 | 11/2003 | Ebersole et al. |
| 2010/0131126 A1* | 5/2010 | He .................... G01C 21/00 701/14 |
| 2012/0182161 A1 | 7/2012 | Rutherford et al. |
| 2012/0194556 A1 | 8/2012 | Schmitt et al. |
| 2014/0058675 A1 | 2/2014 | He et al. |

FOREIGN PATENT DOCUMENTS

| | | |
|---|---|---|
| EP | 2199746 A2 | 6/2010 |
| WO | 0120583 A2 | 3/2001 |

OTHER PUBLICATIONS

Rockwell Collins; Pro Line 21 Synthetic Vision System (SVS); 147-1304-000-CS 05/11 BUS © Copyright 2011, Rockwell Collins, Inc.

Universal Avionics; Vision-1+Synthetic Vision System; Universal Avionics Systems Corporation, 2002.

Extended EP Search Report for Application No. 15194153.1-1557 dated Apr. 25, 2016.

\* cited by examiner

SYSTEM AND METHOD FOR EXOCENTRIC DISPLAY OF INTEGRATED NAVIGATION

TECHNICAL FIELD

The exemplary embodiments described herein generally relate to aircraft displays and more particularly to the display of a strategic overview of a flight plan on an aircraft navigational display.

BACKGROUND

Modern map displays, particularly those used in aircraft for flight planning and monitoring, are capable of displaying a considerable amount of information such as terrain information and flight planning information. The terrain information may include situational awareness terrain and cautions that identify potential hazards. Flight planning information may include, for example, flight path and altitude information useful to the pilot.

An interactive navigation moving map display allows simultaneous display of traffic, terrain, airspace, airways, airports and navigation aids. Working in tandem, a synthetic vision system and INAV display give the pilot a complete strategic and tactical flight planning and control system. In real time, the pilot can confidently compare current conditions outside the aircraft against the strategic flight plan, and make decisions accordingly.

These electronic instrumentation displays continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task.

Worldwide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. One such influence on flight performance has been the ability for the flight crew to comprehend the displayed information while paying attention to other matters within and outside of the cockpit, especially during periods of high or low activity.

Accordingly, it is desirable to provide a system and method for strategic overview of a flight plan on an aircraft navigational display. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for strategic overview of a flight plan on an aircraft navigational display.

In an exemplary embodiment, a method of displaying a strategic navigational overview for a vehicle comprises displaying a navigational map including a marker icon representing an entity pertinent to navigation of the vehicle; displaying a vertical line contacting the marker icon; displaying a current altitude icon contiguous to the vertical line representing a current altitude of the vehicle; and displaying a trending icon contiguous to the vertical line indicating a direction of a change in altitude of the vehicle when the change exists.

In another exemplary embodiment, a system for displaying a strategic navigational overview for a vehicle, comprises a display configured to display a perspective navigational map; a processor coupled to the display and configured to prompt the display to display a marker icon representing an entity pertinent to navigation of the vehicle; display a vertical line contacting the marker icon; display a current altitude icon contiguous to the vertical line representing a current altitude of the aircraft; and display a trending icon contiguous to the vertical line indicating a direction of a change in altitude when the change exists.

In yet another exemplary embodiment, a system for displaying a strategic navigational overview for an aircraft, comprises a display configured to display a moving navigational map; a processor coupled to the display and configured to prompt the display to display a marker icon representing an entity pertinent to navigation of the aircraft; display a vertical line contacting the marker icon; and display a current altitude icon contiguous to the vertical line representing a current altitude of the aircraft.

BRIEF DESCRIPTION OF THE DRAWINGS

The present invention will hereinafter be described in conjunction with the following drawing figures, wherein like numerals denote like elements.

DETAILED DESCRIPTION

Figure 1:
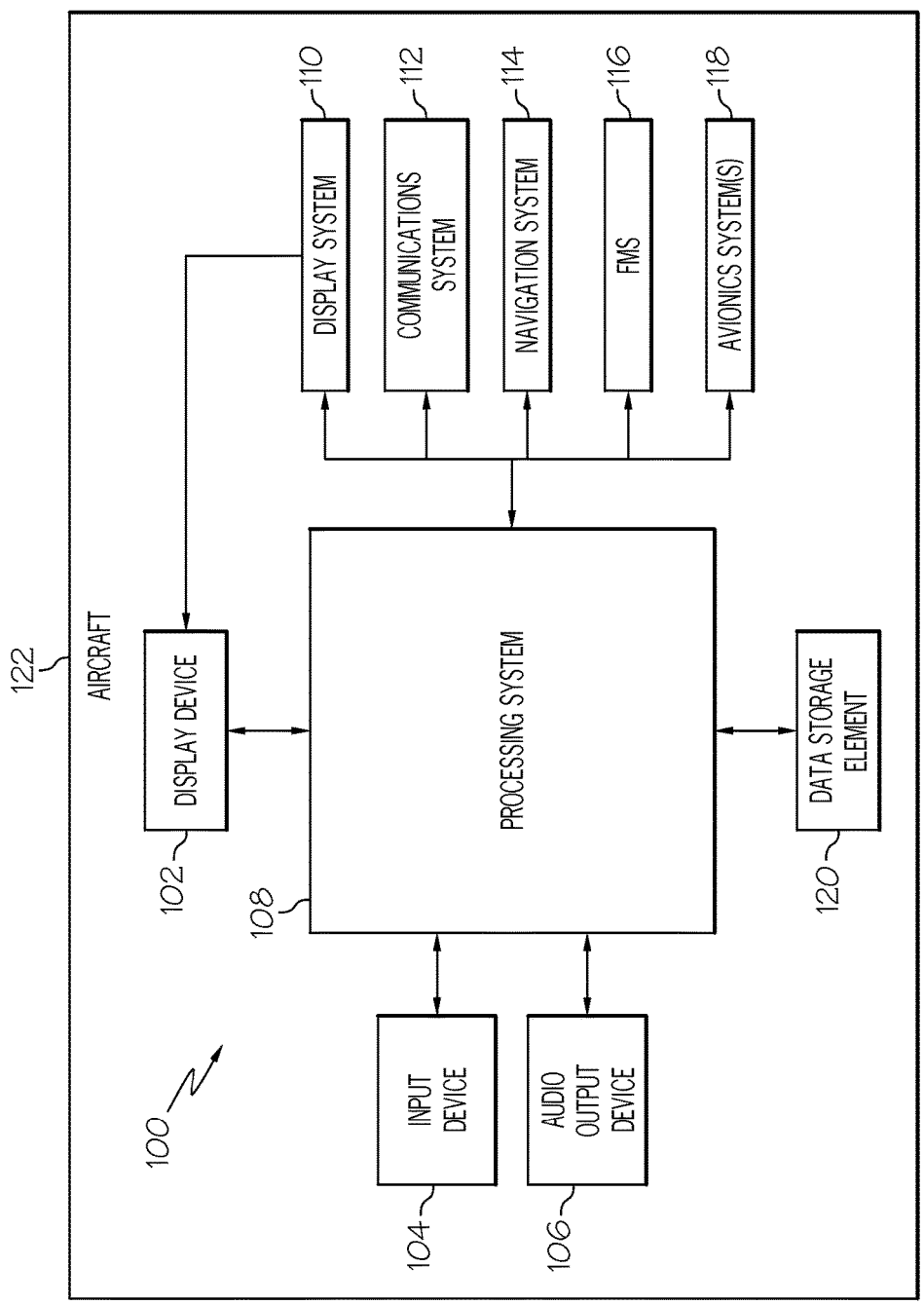
FIG. 1 is a block diagram of a system suitable for use in an aircraft in accordance with one embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Although embodiments described herein are specific to aircraft display systems, it should be recognized that principles of the inventive subject matter may be applied to other vehicle display systems such as displays in sea going vessels and displays used by off-site controllers, e.g., ground controllers.

The aviation environment is described herein as an exemplary embodiment and may include navigation from point to point including an approach and landing at an airport. Generally a lateral view display is presented in conjunction with the vertical view presented herein. Various types of maps may be used for display on the lateral view, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, and range rings) and nearby environmental features (e.g., terrain, weather conditions, and political boundaries).

Alternate embodiments of the present invention to those described below may utilize whatever navigation system signals are available, for example a ground based navigational system, a GPS navigation aid, a flight management system, and an inertial navigation system, to dynamically calibrate and determine a precise course.

A system and method are provided for displaying (presenting), to a crewmember of a vehicle, markers along a route of the vehicle. The marker icons identify an entity of interest to the crewmember and may include, for example, waypoints, special purpose areas, and hazards such as weather, terrain, traffic. Information is encoded into the marker icons allowing the user to infer distance and altitude for the present aircraft state and/or the predicted aircraft state. The information is displayed on the navigation screen along the route of flight and preferably includes a vertical line (or pole) emanating from the marker icon. Vertical as used herein means substantially parallel with the direction of gravity. A first symbol on the vertical line indicates the current altitude of the vehicle, while a second symbol on the vertical line indicates the altitude of the vehicle when it reaches the hazard computed from the current flight path and vehicle energy state. The planned route of flight may also be displayed so the crewmember may infer the proximity of the markers.

FIG. 1 depicts an exemplary embodiment of a system 100, which may be located onboard a vehicle such as an aircraft 122. In an exemplary embodiment, the system 100 includes, without limitation, at least one display 102, an input device 104, an audio output device 106, a processing system 108, a display system 110, a communications system 112, a navigation system 114, a flight management system (FMS) 116, one or more avionics systems 118, and a data storage element 120 suitably configured to support operation of the system 100, as described in greater detail below. It should be understood that FIG. 1 is a simplified representation of a system 100 for purposes of explanation and ease of description, and FIG. 1 is not intended to limit the application or scope of the subject matter in any way. Practical embodiments of the system 100 and/or aircraft 122 will include numerous other devices and components for providing additional functions and features, as will be appreciated in the art. In this regard, although FIG. 1 depicts a single avionics system 118, in practice, the system 100 and/or aircraft 122 will likely include numerous avionics systems for obtaining and/or providing real-time flight-related information that may be displayed on the display 102 or otherwise provided to a user (e.g., a pilot, a co-pilot, or crew member). A practical embodiment of the system 100 and/or aircraft 122 will likely include one or more of the following avionics systems suitably configured to support operation of the aircraft 122: a weather system, an air traffic management system, a radar system, a traffic avoidance system, an enhanced ground proximity warning system, an autopilot system, an autothrust system, a flight control system, an electronic flight bag and/or another suitable avionics system.

In an exemplary embodiment, the display 102 is coupled to the display system 110. The display system 110 is coupled to the processing system 108, and the processing system 108 and the display system 110 are cooperatively configured to display, render, or otherwise convey one or more graphical representations or images associated with operation of the aircraft 122 on the display 102, as described in greater detail below. The processing system 108 is coupled to the navigation system 114 for obtaining real-time navigational data and/or information regarding operation of the aircraft 122 to support operation of the system 100. In an exemplary embodiment, the communications system 112 is coupled to the processing system 108 and configured to support communications to and/or from the aircraft 122, as will be appreciated in the art. The processing system 108 is also coupled to the flight management system 116, which in turn, may also be coupled to the navigation system 114, the communications system 112, and one or more additional avionics systems 118 to support navigation, flight planning, and other aircraft control functions in a conventional manner, as well as to provide real-time data and/or information regarding operation of the aircraft 122 to the processing system 108. In an exemplary embodiment, the input device 104 is coupled to the processing system 108, and the input device 104 and the processing system 108 are cooperatively configured to allow a user to interact with the display 102 and other elements of system 100 by providing an input to the input device 104, as described in greater detail below.

The display 102 is configured to provide the enhanced images to the operator. In accordance with an exemplary embodiment, the display 102 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 102 may additionally be implemented as a panel mounted display, a HUD (head-up display) projection, or any one of numerous known technologies. It is additionally noted that the display 102 may be configured as any one of numerous types of aircraft flight deck displays. For example, it may be configured as a multi-function display, a horizontal situation indicator, or a vertical situation indicator. In the depicted embodiment, however, the display 102 is configured as a primary flight display (PFD).

In operation, the display 102 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display 102 is suitably designed to process data obtained from the sources of flight status data in the manner described in more detail herein. In particular, the display 102 can use the flight status data of the host aircraft when rendering the ITP display.

The input device 104 includes, for example, but is not limited to, keyboards, pointer devices, touch screens, microphones. In some embodiments, the input device 104 includes more than one type of input element. In other embodiments, the system 100 does not include any input device 104, and/or the input device 104 is only used to override automated functions of the system 100.

The processing system 108 generally represents the hardware, software, and/or firmware components configured to facilitate communications and/or interaction between the input device 104, audio output device 106, and the other elements of the system 100 and perform additional tasks and/or functions described in greater detail below. Depending on the embodiment, the processing system 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In some embodiments, the features and/or functionality of the processing system 108 may be implemented as part of the flight management system 116 or another avionics system 118, as will be appreciated in the art.

The data storage element 120 may be realized as RAM memory, flash memory, EPROM memory, EEPROM memory, registers, a hard disk, a removable disk, a CD-ROM, or any other form of storage medium known in the art. In this regard, the data storage element 120 can be coupled to the processor 108 such that the processor 108 can be read information from, and write information to, the data storage element 120. In the alternative, the data storage element 120 may be integral to the processor 108. As an example, the processor 108 and the data storage element 120 may reside in an ASIC. In practice, a functional or logical module/component of the display 102 might be realized using program code that is maintained in the data storage element 120. Moreover, the data storage element 120 can be used to store data utilized to support the operation of the display 102, as will become apparent from the following description.

In an exemplary embodiment, the display 102 is realized as an electronic display configured to graphically display flight information or other data associated with operation of the aircraft 122 (e.g., data from one or more avionics systems 112, 114, 116, 118) under control of the display system 110 and/or processing system 108. In an exemplary embodiment, the display 102 is onboard the aircraft 122 and located within the cockpit of the aircraft 122. It will be appreciated that although FIG. 1 shows a single display 102, in practice, additional display devices may be present onboard the aircraft 122. In an exemplary embodiment, the input device 104 is located within the cockpit of the aircraft 122 and adapted to allow a user (e.g., pilot, co-pilot, or crew member) to provide input to the system 100 and enables a user to interact with the elements of the system 100, as described in greater detail below. It should be appreciated that although FIG. 1 shows the display 102 and the input device 104 as being located within the aircraft 122, in practice, one or more of the display 102 and/or the input device 104 may be located outside the aircraft 122 (e.g., on the ground as part of an air traffic control center or another command center such as a remote control system) and communicatively coupled to the remaining elements of the system 100 (e.g., via a data link).

In an exemplary embodiment, the navigation system 114 is configured to obtain one or more navigational parameters associated with operation of the aircraft 122. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. In an exemplary embodiment, the communications system 112 is suitably configured to support communications between the aircraft 122 and another aircraft or ground location (e.g., air traffic control). In this regard, the communications system 112 may be realized using a radio communication system or another suitable data link system. In an exemplary embodiment, the flight management system 116 maintains information pertaining to a current flight plan (or alternatively, a current route or travel plan).

In accordance with one or more embodiments, the flight management system 116 (or another avionics system 118) is configured to determine, track, or otherwise identify the current operating state (e.g., flight phase or phase of flight) of the aircraft 122, as described in greater detail below. As used herein, a flight phase or phase of flight of the aircraft 122 should be understood as a distinguishable segment of the operation (or distinguishable operating phase) of the aircraft 122 associated with traversing the aircraft 122 from a starting location to an ending location. For example, operation of the aircraft 122 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an approach phase, a landing phase, and the like. Various phases of flight are well known, and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases. In addition to delineated flight phases, the flight management system 116 may identify other operating states of the aircraft 122, such as, for example, operation with one or more engines disabled, operation when afterburners onboard the aircraft 122 are being utilized, transonic and/or supersonic operation of the aircraft 122, and the like.

The display system 110 generally represents the hardware, software, and/or firmware components configured to control the display and/or rendering of one or more navigational maps and/or other displays pertaining to operation of the aircraft 122 and/or avionics systems 112, 114, 116, 118 on the display 102. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying content on the display 102.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 108 will include numerous other devices and components for providing additional functions and features, as will be appreciated in the art.

During the course of this description, like numbers may be used to identify like elements according to the different figures that illustrate the various exemplary embodiments.

Figure 2:
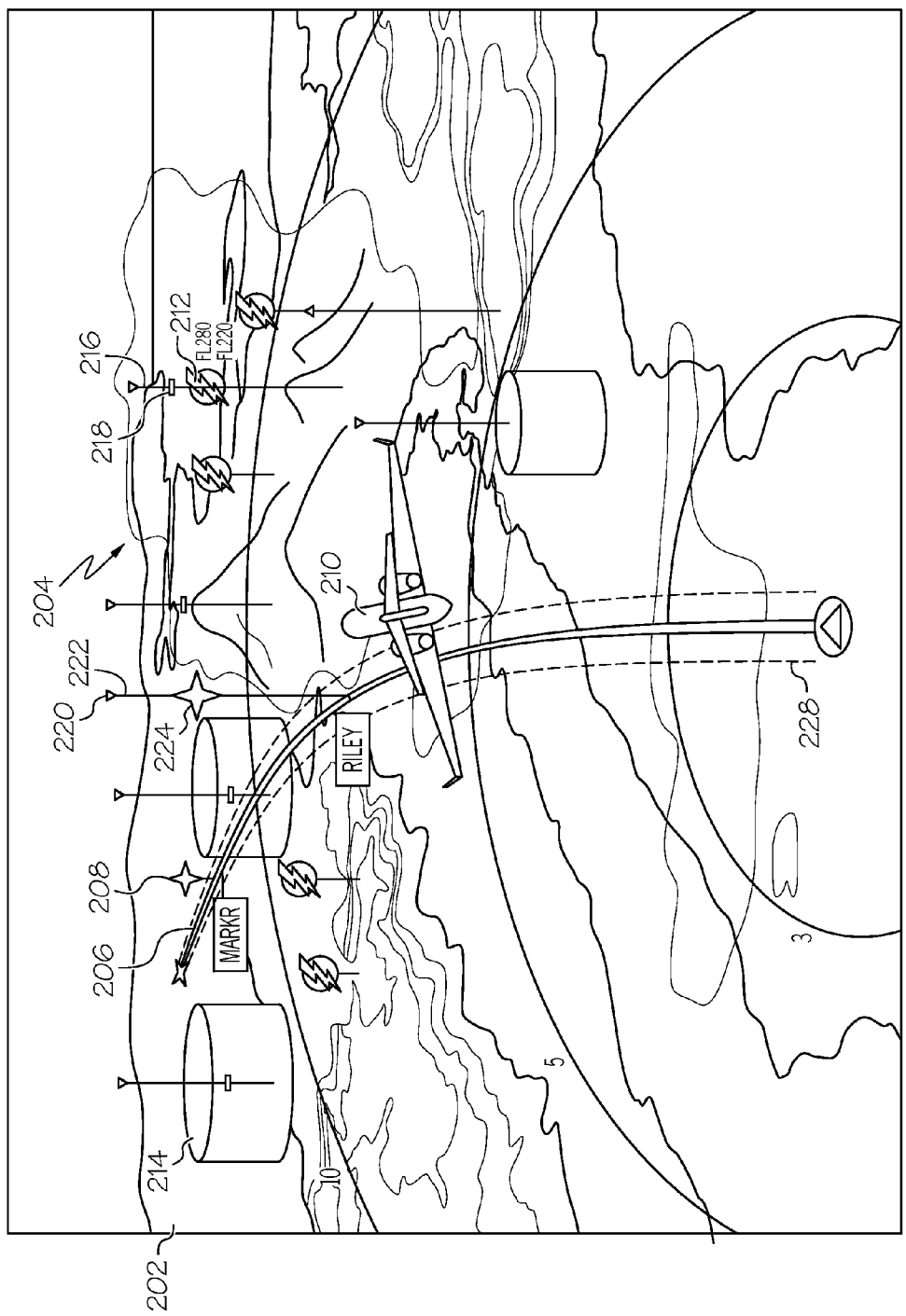
FIG. 2 is a navigational display in accordance with an exemplary embodiment.

While the exemplary embodiments include indicating to a crew member of a vehicle of markers important to the planned route of travel, the exemplary embodiment described with reference to FIG. 2 is that of an aircraft flying a route of flight. The display 102 presents an image 200 preferably of a perspective view. The image 200 includes the terrain 202, one or more markers 204, a desired flight path 206 displayed on the terrain 202, one or more waypoints 208, and the aircraft 210. The displayed markers 204 include, in addition to the weather 212 and special purpose areas 214, may include terrain 202 and traffic (not shown). It is noted a marker 204 indicating weather 212 when for turbulence, may include an altitude or a range of altitudes, for example, FL220 to FL280 wherein the turbulence is of concern.

A vertical line 216, or pole, is associated with one or more of the weather icons 212, special purpose areas 214, and terrain 202. A current altitude icon 218 may be positioned contiguous to one or more of the vertical lines 216 showing the current altitude of the aircraft 210. Additionally, a trending altitude icon 220 may be positioned contiguous to each vertical line 216 that indicates an increasing or decreasing altitude based on the current aircraft 210 energy state. As used herein, contiguous means touching or near.

A vertical line 216 may also be associated with a waypoint. For example, the vertical line 222 is associated with the waypoint RILEY, wherein the current altitude is indicated by the waypoint icon 224.

The format of the vertical lines 216 and optionally the markers may be modified, e.g., highlighted, if within a threshold of the desired flight path 206. For example, a swath 228 may be determined bases on a required navigation performance (RNP) or an estimate of position uncertainty (EPU). If the marker is within the swath 228, the format would be modified. RNP is a statement of the 95 percent navigation accuracy performance that meets a specified value for a particular phase of flight or flight segment and incorporates associated onboard performance-monitoring features, and designates the lateral performance requirement in NM increments. EPU is a defined statistical indication based on a defined scale in nautical miles, which conveys the current position estimation performance.

Highlighted means a visually distinguishable presentation, for example, by contrasting from other icons by using a different font, color, and intensity. The determining factor on when the indication is highlighted may be based on a location, including a distance to or from hazard, or it may be based on a time referenced to a hazard. While the hazard may be a location, it may also include temporal events related to the phases of flight.

While the FMS preferably provides the information upon which the marker is defined, such information may be provided by databases for which the FMS does not have access.

Figure 3:
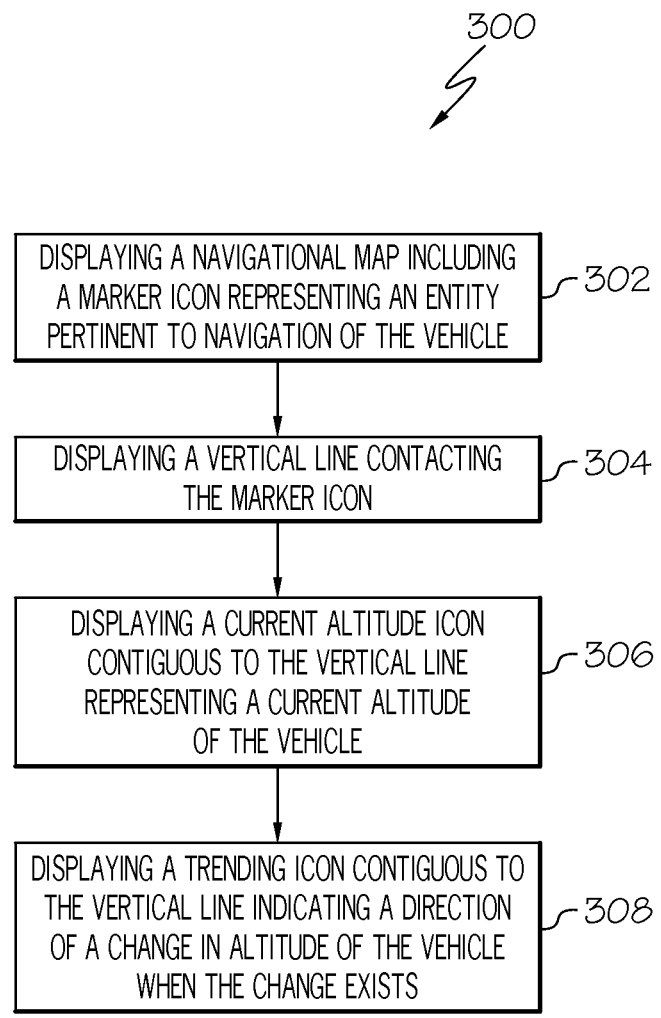
FIG. 3 a flow diagram of an exemplary method suitable for use with the display system of FIG. 1 in accordance with the exemplary embodiments.

FIG. 3 is a flow chart that illustrates an exemplary embodiment of a method 300 suitable for use with a flight deck display system 100. Method 300 represents one implementation of a method for displaying aircraft approaches or departures on an onboard display of a host aircraft. The various tasks performed in connection with method 300 may be performed by software, hardware, firmware, or any combination thereof. For illustrative purposes, the following description of method 300 may refer to elements mentioned above in connection with preceding FIGS. In practice, portions of method 300 may be performed by different elements of the described system, e.g., a processor, a display element, or a data communication component. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

In accordance with the exemplary method of FIG. 3, a method of displaying a strategic navigational overview for a vehicle, comprises displaying 302 displaying a navigational map including a marker icon representing an entity pertinent to navigation of the vehicle; displaying 304 a vertical line contacting the marker icon; displaying 306 a current altitude icon contiguous to the vertical line representing a current altitude of the vehicle; and displaying 308 a trending icon contiguous to the vertical line indicating a direction of a change in altitude of the vehicle when the change exists.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for operating a vehicle display system having a display and a processor, the method comprising:
   displaying, by the display, a navigational map;
   prompting the display, by the processor, to display a marker icon representing an entity pertinent to navigation of the vehicle on the navigational map;
   prompting the display, by the processor, to display a vertical line contacting the marker icon;
   determining, by the processor, a current altitude of the vehicle and a change in the current altitude of the vehicle;
   prompting the display, by the processor, to display a current altitude icon that continuously contacts the vertical line while moving along the vertical line to represent the determined current altitude of the vehicle;
   prompting the display, by the processor, to display a trending icon contiguous to the vertical line indicating a direction of the determined change in the current altitude of the vehicle.

2. The method of claim 1, wherein the vertical line includes a first end contiguous to a terrain and a second end having the trending icon positioned thereon.

3. The method of claim 1, wherein the marker icon represents weather pertinent to a route of flight of the vehicle.

4. The method of claim 1, wherein the entity comprises the terrain pertinent to a route of flight of the vehicle.

5. The method of claim 1, wherein the marker icon represents a special use airspace pertinent to a route of flight of the vehicle.

6. The method of claim 1, wherein the marker icon represents a waypoint pertinent to a route of flight of the vehicle.

7. The method of claim 1, further comprising:
determining, by the processor, if the marker is within a threshold associated with a desired route of flight; and
prompting the display, by the processor, to modify the format of the marker icon displayed by the display if the vehicle is within the threshold.

8. The method of claim 1, further comprising:
prompting the display, by the processor, to display a swath encompassing the desired route of flight.

9. The method of claim 8 further comprising:
determining, by the processor, the dimensions of the swath based on one of a required navigation performance or an estimate of position uncertainty.

10. The method of claim 1 wherein the marker icon represents weather pertinent to a route of flight of the vehicle; and
further comprising prompting the display, by the processor, to:
display an altitude or a range of altitudes associated with the weather.

11. A system for displaying a strategic navigational overview for a vehicle, comprising:
a display configured to:
display a perspective navigational map;
a processor coupled to the display and configured to prompt the display to:
display a marker icon representing an entity pertinent to navigation of the vehicle;
display a vertical line contacting the marker icon;
display a current altitude icon that continuously contacts the vertical line while moving along the vertical line to represent a current altitude of the vehicle; and
display a trending icon contiguous to the vertical line indicating a direction of a change in altitude when the change exists.

12. The system of claim 11, wherein the display is configured to display the vertical line having a first end contiguous to a terrain and a second end having the trending icon positioned thereon.

13. The system of claim 11, wherein the marker represents one of the items pertinent to a route of flight selected from the group consisting of weather, terrain, a special use airspace, and a waypoint.

14. The system of claim 11 wherein the processor is further configured to:
determine if the vehicle is within a threshold associated with the desired route of flight; and
modify the format of the marker if the vehicle is not within the threshold.

15. The system of claim 11, wherein the processor is further configured to prompt the display to:
display a swath encompassing the desired route of flight, wherein the dimensions of the swath are determined based on one of a required navigation performance or an estimate of position uncertainty.

16. A system for displaying a strategic navigational overview for an aircraft, comprising:
a display configured to:
display a moving navigational map;
a processor coupled to the display and configured to prompt the display to:
display a marker icon representing an entity pertinent to navigation of the aircraft;
display a vertical line contacting the marker icon; and
display a current altitude icon that continuously contacts the vertical line while moving along the vertical line to represent a current altitude of the aircraft.

17. The system of claim 16 wherein the processor is further configured to:
display a trending icon contiguous to the vertical line indicating a direction of a change in altitude when the change exists.

18. The system of claim 17, wherein the display is configured to display the vertical line having a first end contiguous to a terrain and a second end having the trending icon positioned thereon.

19. The system of claim 16, wherein the marker represents one of the items pertinent to a route of flight selected from the group consisting of weather, terrain, a special use airspace, and a waypoint.

20. The system of claim 16 wherein the processor is further configured to:
determine if the vehicle is within a threshold associated with the desired route of flight; and
modify the format of the marker if the vehicle is not within the threshold.

* * * * *